United States Patent [19]

Cochran

[11] Patent Number: 5,503,879
[45] Date of Patent: Apr. 2, 1996

[54] METHOD OF MAKING A FLEXIBLE COMPOSITES

[75] Inventor: William H. Cochran, Exeter, R.I.

[73] Assignee: RanDemo Inc., North Kingstown, R.I.

[21] Appl. No.: 453,199

[22] Filed: May 30, 1995

Related U.S. Application Data

[63] Continuation of Ser. No. 236,258, May 2, 1994, which is a continuation of Ser. No. 985,229, Dec. 2, 1992, abandoned, which is a continuation of Ser. No. 541,972, Jun. 22, 1990, abandoned.

[51] Int. Cl.⁶ .................................................. B05D 3/02
[52] U.S. Cl. ................. 427/389.9; 264/257; 264/331.19; 427/393.5; 428/224; 428/265; 428/290
[58] Field of Search .......................... 264/51, 54, 257, 264/258, 331.19; 427/385.5, 389.9, 393.5; 428/224, 265, 290

[56] References Cited

U.S. PATENT DOCUMENTS

| | | |
|---|---|---|
| 3,087,201 | 4/1963 | Williams et al. . |
| 3,152,949 | 10/1964 | Guthrie . |
| 3,597,307 | 8/1971 | Paulusma ............................ 161/170 |
| 3,817,819 | 6/1974 | Hoppe et al. . |
| 4,015,039 | 3/1977 | Segal et al. . |
| 4,023,835 | 5/1977 | Ewing et al. ........................ 285/235 |
| 4,051,100 | 9/1977 | Bjerk et al. ......................... 260/42.18 |
| 4,251,428 | 2/1981 | Recker et al. . |
| 4,288,563 | 9/1981 | Thorpe . |
| 4,353,955 | 10/1982 | Cook . |
| 4,596,835 | 6/1986 | Werner et al. . |
| 4,651,445 | 3/1987 | Hannibal . |
| 4,695,509 | 9/1987 | Cordova et al. .................... 264/257 X |
| 4,738,999 | 4/1988 | Blenner et al. . |
| 4,766,014 | 8/1988 | Poletto .................................. 427/245 |
| 4,883,700 | 11/1989 | Harpell . |
| 4,892,780 | 1/1990 | Cochran et al. . |
| 4,894,281 | 1/1990 | Yagi et al. ............................. 428/286 |
| 4,916,000 | 4/1990 | Li et al. . |
| 4,936,085 | 6/1990 | Kolmes et al. . |
| 5,149,739 | 9/1992 | Lee ........................................ 525/66 |
| 5,397,611 | 3/1995 | Wang .................................. 264/51 X |

FOREIGN PATENT DOCUMENTS 0240118  10/1987  European Pat. Off. .

OTHER PUBLICATIONS

Chou, Journal of Materials Science, 24:761–783 (1989).
Chou et al., Scientific American, Oct. 1988, vol. 255, No. 4, pp. 193–203.

*Primary Examiner*—Michael Lusignan
*Attorney, Agent, or Firm*—Cushman Darby & Cushman

[57] ABSTRACT

A flexible composite comprising a high tensile strength fibrous component dispersed within a flexible or resilient polymeric matrix, the matrix and fibrous component being essentially unbonded to each other so that the composite retains essentially the flexibility of the polymeric matrix.

5 Claims, No Drawings

METHOD OF MAKING A FLEXIBLE COMPOSITES

This is a continuation of application Ser. No. 08/236,258, filed May 2, 1994 which is a continuation of Ser. No. 07/985,229, filed Dec. 2, 1992, now abandoned, which is a continuation of Ser. No. 07/541,972, filed Jun. 22, 1990, now abandoned.

FIELD OF THE INVENTION

The present invention is concerned with a flexible or resilient composite comprising a polymeric matrix having a fibrous component dispersed therein for reinforcement. The composite is characterized by its high puncture resistance and other useful properties.

BACKGROUND OF THE INVENTION

A great deal of research effort has been, and is currently being, expended towards developing composites of resins and fibrous materials which provide needed properties. Typically such composites may include any one or more conventional resins or other matrix material such as epoxy or polyester resins, reinforced with various types of fibers including, for example, glass or metal fibers or the like.

A useful discussion regarding composites appears in an article by Chou et al entitled "Composites" appearing in *Scientific American,* Oct. 1986, Volume 255, No. 4, pages 193–202. The article describes a variety of different types of composites comprising fibrous materials dispersed in various matrix materials. The article notes that, in the case of a brittle, ceramic matrix material, a crack in the matrix may cause the reinforcing fiber to fail as well unless the bond between the matrix and fiber is quite weak. Normally, however steps are taken to provide for maximum bonding between the matrix and fibrous component. This may be accomplished by appropriate selection of the matrix and fibers and/or by pretreatment of the fibers to provide physical or chemical bonding to the matrix.

As noted, a variety of fibrous components in various forms, e.g. metal, glass, polyester, etc. in the form of woven, non-woven or knitted fabrics, or as staple fibers or filament bundles, have been proposed for composite use. More recently such materials as aramid and extended chain polyethylene fibers (e.g. "Spectra" fibers) have been proposed for use in compositions. However, as far as can be ascertained, all such previously disclosed uses have required adhesion between the fibrous component and the matrix to provide useful flexible or resilient composites.

SUMMARY OF THE INVENTION

The present invention is based on the finding that a highly useful resilient or flexible composite can be obtained by combining a resilient resin component and a fibrous component such that the resin encases or envelops the fibrous component with essentially no adhesion or bond between the two components. This is substantively different from prior compositions where, as noted, bonding between the resin and fibrous components has been considered desirable, if not essential. In the present case, the resin and fibrous components are so chosen that any significant amount of bonding does not occur. As a consequence, the resin, which is itself resilient, can retain its resiliency while performing the matrix function. At the same time, the fibrous component adds strength and other desirable properties, particularly puncture-resistance, to the composite.

Particularly effective results are obtained by forming the resin matrix in situ about the fibrous component which may be in the form of staple fibers, continuous filament, non-woven, woven or knitted fabric.

In a preferred embodiment, the invention contemplates the use of ultra-high molecular weight, high tensile strength, high modulus extended chain polyethylene fibers as the fibrous component and flexible polyurethane formed in situ by positioning the urethaneforming components about the fibers and allowing the desired urethane-forming reaction to occur. Such fibers and resin matrix do not bond together, the non-bonding effect being aided by the highly lubricious nature of the polyethylene fibers. Polyester fibers may also be usefully employed with the flexible polyurethane matrix or the like as long as any significant chemical bonding between the matrix and fibrous component is avoided. According to the invention, the composite is essentially as resilient as the polyurethane itself until the composite is bent to the point where the fibers in the matrix are snubbed, i.e. the matrix contracts around individual fibers to affect a braking action on the slippage between the matrix and fibers. Up to this point, the composite may be bent without causing tension on the encapsulated fibers which, in a sense, float within the resin matrix. However, when the bending of the composite is such that fiber snubbing or braking occurs, the fibers increase their reinforcing effect by coacting with fibers in proximity thereto so as to spread the load placed on the composite. Then, when the bending force is released, the energy stored up in the snubbed fibers facilitates the return of the composite to its prior dimensions. The composite thus, in essence, retains desired flexibility or resiliency of the resin component while being reinforced by, and otherwise benefiting from, the fibers.

It is to be noted that the manner in which the present composite functions on bending and release would not be possible if the fibers and matrix were physically or chemically bonded together. Thus, significant or intentional adhesion between the fibers and matrix restricts flexibility and the thus encased fibers might well break before sharing the bending load with other adjacent fibers. In the present case, the fibers do not change position before, during or after deformation with respect to the matrix. The fibers instead float unadhered within the matrix until the composite is bent to the point where the fibers are stubbed or squeezed in their position by the bent matrix, the energy stored in the thus stubbed fibers helping to spring the composite back to its original form when the bending force is released.

DETAILED DESCRIPTION OF THE INVENTION

A wide variety of resilient polymeric materials may be used to provide the matrix for the present composite. Preferably, however, as noted above, the matrix comprises a flexible or resilient polyurethane which is formed in situ by application of the polyurethane-forming reactants about the fibrous component followed by reaction and curing. Typically, the polyurethane-forming reactants comprise (A) an aliphatic isocyanate, e.g. an isocyanate prepolymer such as isophrone diisocyanate, or diphenylmethane diisocyanate and (B) an aliphatic hydroxy component such as a polyester polyol or a mixture thereof with polypropylene glycol. Any conventional polyurethane-forming components may be used for this purpose provided the polyurethane reaction occurs at a temperature below the melting point of the fibrous component. Preferably, the polyurethane is formed by separately preheating the reactants (A) and (B) to a temperature of, for example, 30°–60° C. and applying these reactants about the fibrous component, the latter being positioned in a mold or otherwise supported at ambient temperature (18°–32° C.). The resulting in situ reaction is an exothermic one which should be controlled, if necessary, to keep the temperature well below the melting point of the fibers involved. Usually, for polyethylene fibers, the temperature will be kept below about 70° C. while higher temperatures, e.g. up to about 120° C. may be observed with low shrinkage polyester fibers.

Polyurethane matrix materials, however, are preferred because they tend to have good abrasion resistance and, in the case of aliphate urethanes, good UV resistance; and in the case of polyethers, good hydrolytic stability.

While polyurethane comprises the preferred matrix, it will be recognized that other resins which are resilient may be used. This includes, for example, vinyl resins, ethylene propylene polymers, epoxies and the like. A variety of fibrous components or mixtures thereof may be used for present purposes. However, as noted, it is preferred that this component comprise either polyester fibers or ultra high molecular weight, high tensile strength polyolefin fibers. Of particular preference are extended chain polyethylene fibers, e.g. fibers available as Spectra 900 and Spectra 1000, which have been found to be especially effective. Such polyethylene fibers have exceptionally high tensile strength and, because of this, a fabric can be made from this fiber that is more open than fabrics made from lesser-strength fibers at a given strength level. For example, a fabric woven of 1,200-denier polyester yarn in a 32 by 32 construction (that is, 32 warp and 32 filling yarns per inch) has virtually no "windows", i.e. there are essentially no openings therein such as there are in woven window screen fabric.such a closed polyester fabric is less strong than an open fabric woven of 1,200 denier yarn of Spectra 900 or 1000 fiber in a 10 by 10 construction (that is, 10 warp and 10 filling yarns per inch). The latter fabric is so open that it has a substantial "window" between each warp and filling yarn. This ability to make a strong fabric with "windows", coupled with the lubricious or slippery nature of the polyethylene fiber, makes this fiber especially useful for present purposes.

It is also noted that "Spectra" fiber transmits load faster than the next most high performance fiber, aramid; nearly twice as fast. Accordingly, when one "Spectra" fiber in fabric form is subjected to a force, that fiber quickly marshalls its companion fibers, sharing their assigned reinforcement task at the rate of 12,300 meters per second. Consequently, a runner, for example, stepping on a nail with a-shoe midsole made according to the invention brings a myriac of super-strong fibers, automatically and virtually immediately, into protective behavior.

The "Spectra" fiber is lighter, i.e. it has a lower specific gravity (0.97) than polyester (1.38) or aramid (1.44) or glass (2.6) or steel (7.0) and still outperforms the other fibers. This is consequential because it enables the present composites to exhibit maximum strength: weight properties.

It is noted that "Spectra" fiber tends to shrink at the boiling point of water and, at 250° F., the fiber starts to weaken slowly but noticeably. As a consequence, the resin selected for use with these fibers should be formed at temperatures well below the boiling point of water, preferably, for example, at essentially hand-washing temperatures (below about 70° C.).

"Spectra" fibers or like extended chain polyolefin fibers do not bond to most resins. Steps have been taken in the past to improve the adhesion properties of these fibers, e.g. by corona or plasma treatment or by special adhesives, in order to form composites because it has been thought that such adhesion was essentials. However, for present purposes, it is important that the fibers not adhere to the resin matrix in order to obtain a resilient composite. In this regard, some incidental physical adhesion may occur between the fibers and the matrix due, for example, to irregularities in the fiber surface. However, such incidental adhesion is not the sort which the invention intends to be avoided. The key thing is to avoid chemical adhesion between the matrix and fibrous components.

The present composite may be prepared in a variety of ways. For example, the resin or resin-forming components may be cast or nipped around the fibers or they may be sprayed among the fibrous component and allowed to set or, in the case where the resin is formed in situ, the resin-forming components are permitted to react and cure. Advantageously, two liquid reactant parts of the matrix resin may be preheated and mixed precisely under high pressure at the head of an airless spray gun. The thus atomized resin mixture is then deposited on and among the prepositioned fibers, these being placed in a suitable jig or mold or the like. Alternatively, the reactants may be co-sprayed with the fibers and any other optional components onto a suitable substrate or mold surface where the resin components react to form the matrix with the fibers dispersed therein. It will be appreciated that the substrate may be a fabric, paper, film, sheet, foil, metal or the like. In whatever method is used, the resin should envelop the reinforcing fibers or fibrous bundle without bonding thereto, it being noted that where a bundle of fibers is used, the resin may encapsulate the bundle while individual fibers thereof are not all encapsulated.

The fibrous component may be in any convenient form, e.g. as individual fibers, filaments, fiber bundles or non-woven, woven or knitted fabric. The term "fibers" is used for convenience herein although it is intended that the term embrace both staple fiber as well as continuous filament, cut to desired length, bundles thereof or fabrics based thereon.

The fibrous component may be used in random or oriented fashion depending, for example, on the properties desired in the composite. In the case of random configuration, staple fibers may be used. Such fibers tend to curl or bend to varying degrees when dispersed within the resin matrix. As an alternative, continuous filaments may be used in a random or scrambled fashion.

Preferably the fibers are used in fabric or bundle form and highly useful results are obtained when the fibers are straight and parallel in a given plane without crimp or meander. Multiple axes, each in a given plane, may also be used when the circumstances warrant. When fiber bundles are used, the bundles preferably include 10–1000 filaments with the bundles arranged in parallel in a common plane. Parallel layers of filaments may also be used with the filaments in each layer oriented at different angles to the filaments in adjacent layers. Preferably straight or uncrimped fibers are used because any force applied to such fibers instantly loads the fibers in tension or compression whereas crimped fibers need to be first straightened out by the applied force.

Orientation of fiber layers is used primarily to build strength in the desired direction(s). Advantageously, the fibers in each layer are in parallel, or essentially so, as this permits the packing of more fibers into a given volume. It is also preferred that the fibers be positioned so that their largest dimension (length) is parallel to the force it is intended to resist. The matrix serves to keep the oriented fibers in alignment, both individually and in bundle form, even through cycles of loading the composite in tension and compression and even though all of the fibers are not completely enveloped by the resin.

The invention is illustrated, but not limited, by the following examples:

EXAMPLE 1

A resin-fiber composite was prepared as follows using a flexible two-reactant polyurethane formed in situ as the resin matrix and fabric composed of "Spectra" 1000 extended chain polyethylene fibers.

The resin was applied by spraying the two-reactant mix about the flat fabric using a fiber:resin ratio (by volume) of 30:70. The fabric was a needle-punched, non-woven fabric (7.7 ounce per square yard) of randomly oriented 2 inch "Spectra" 1000 fibers.

The polyurethane used in this example comprised two reactive components as follows:

| Material | Parts by Weight |
| --- | --- |
| (A) polypropylene glycol | 50 |
| polyester polyol | 50 |
| phenyl mercuric carboxylate | 0.5 |
| (B) isophorone diisocyanate | |
| (aliphatic isocyanate prepolymer - | |
| B.P. greater than 316° F.) | |

50 Parts of (A) and 50 parts of (B), by volume, were used to form the polyurethane matrix. These reactants were each separately preheated to 50° C. before combining and applying to the fabric. The fabric was at ambient temperature but because of the exothermic reaction involved, the temperature rose to about 60° C. The resulting polyurethane began to gel in about 20–25 seconds and the thus forming composite was subjected to pressure to reduce the thickness to below 1 millimeter. A platen press was used for this purpose although a vacuum device could also be used. The gelling time could also be reduced by increasing the temperature of the environment about the composite.

The polyurethane obtained after the reaction was completed had a Shore A hardness of about 80 and the composite was characterized by its resilience and puncture resistance.

The above polyurethane can be replaced by a more rigid polyurethane, e.g. one having a Shore D hardness of about 60, to also provide highly useful composition according to the invention.

EXAMPLE 2

A composite was prepared by spraying a two-component polyurethane-forming mix onto fabric using a fiber:resin ratio (by volume) of about 50:50 so as to fully encase the fabric, followed by surface coating with unreinforced resin.

The fabric used was a tri-axial knit of 650 denier, 60 filament, no-twist Spectra 900 with 12 yarns per inch in weft direction, 12 yarns per inch, each −45 and +45 degrees to the warp (no strength yarn in the machine direction) and 70 denier polyester knit around (not through) the Spectra strength yarns to facilitate handling of the web.

The resin was allowed to form in situ as in Example 1. The product was a strong, resilient composite demonstrating high puncture resistance.

The resin-forming composition in this example comprised, by volume, 50 parts of diphenylmethane diisocyanate and 50 parts of polyol, primarily polypropylene glycol.

EXAMPLE 3

A non-woven web of randomly oriented Spectra 1000 fibers approximately 2 inches long and weighing approximately 5 ounces per square yard was saturated with an aliphatic polyurethane casting compound, essentially as used in Example 1. Care was taken to avoid entrapment of visible air bubbles. The casting compound could also be introduced around the fibers by an atomized spray or any other known method.

The resulting composite material weighed 11 ounces per square yard, exhibited excellent penetration resistance, color stability and high flexibility. The composite is suitable for applications requiring flexibility and high strength such as the midsole of a shoe, or the like.

EXAMPLE 4

A tri-axial knit fabric (+45 deg., 0 deg., −45 deg.) of 650 denier Spectra 900 weighing approximately 8 ounces per square yard was used as the reinforced fiber for the composite. The fabric was knit so as to avoid crimp of the fibers, which increases load transmission in the resulting composite. An aromatic polyurethane compound essentially as in Example 2 was sprayed onto the fabric so as to penetrate the bundles of the yarns.

The resulting composite weighing approximately 14 ounces per square yard was flexible and exhibited excellent penetration, abrasion, and cut resistance and tensile strength greater than either the matrix resin or reinforcing fabric alone. The composite so formed would be suitable for applications in soft luggage, or the like.

It is to be noted that Spectra 900 and Spectra 1000 fibers were used in the above examples. It is preferred to use Spectra 900 because such fibers have-a somewhat larger diameter (38 microns compared to 27 microns for the Spectra 1000) and evidences less cutting of the resin matrix on flexing and stressing of the composite. Spectra 1000 is actually stronger than the Spectra 900 but the canals through the void fraction of a 900 fabric are larger in section perpendicular to their axes than through the void fraction of a 1000 fabric of equivalent strength. The larger canals in the 900 fabric appear to facilitate the positioning of the resin components to form the resin in situ and thus encapsulate the fibers.

The composites demonstrated in the above examples, broadly speaking, comprise a resilient, flexible or elastic polyurethane matrix formed in situ about a layer of high strength extended chain polyethylene fibers. The matrix and fibers are not bonded to each other and, because of this and the high degree of lubricity demonstrated by the fibers, the composite has essentially the same degree of resilience or elasticity of the resin itself up to the point where the composite is bent sufficiently for the matrix to start bearing and braking on and around the fibers (snubbing). At that point, any further bending of the composite spreads the load along to adjacent fibers or fiber segments. Then, when the bending stress is released, the energy accumulated in the fibers and their matrix is also released and the composite restores itself to its original shape. The springy nature of Spectra fiber assists in this regard.

Flexibility of the composite results in large measure from the fact that there is little or no bonding between the fibers and matrix and the flexible or resilient nature of both materials. As the material is flexed, the fibers, on a microscopic scale, are free to bend and do not function to strengthen the matrix until the degree of bending is such that the fibers are squeezed or stubbed by the matrix. Up to this point, the fibers can flex and bend freely because they are essentially independent of the matrix and flexibility is, at this stage, determined preponderantly by the characteristics of the resin matrix itself. However, with further bending, the fibers themselves begin to exert a braking action as they are squeezed by the bent matrix, thus serving to reinforce the bent composite and assist it to return to its original form when the stress is relieved.

As noted, the fibers provide the composite with outstanding penetration resistance. In this regard, the matrix functions to hold the fibers within the matrix so that any load applied to the composite, e.g. the .load resulting from the application of a piercing object such as a nail or ice pick, is shared by the multiple fibers as a group. The applied load is thus distributed over the multiplicity of fibers in accord with the stress applied. This gives the composite a high degree of puncture resistance.

The composites of the invention are suitable for a broad array of industrial and consumer products, particularly those requiring puncture resistance and strength with flexibility. This includes such diverse products as luggage, footwear, body protection, boats, portable buildings and greenhouses, highway delineators, buoys and the like. The composites have exceptionally high strength:weight ratios and can be essentially abrasion- and puncture-proof. While the products as described are resilient,, i.e. sufficiently flexible to recover their original shape after deformation or flexing, they may also be made into rigid forms if such construction is desired.

A particularly useful application of the present composites is as reinforcement in the corners or other parts of luggage. Luggage is frequently pierced in transport. The use of the present composites with their significant puncture resistance can effectively deal with this problem.

Another particularly significant area of use which depends largely on the improved puncture resistance of the composites is in the provision of protective Clothing for law enforcement or the like where pointed objects may be encountered. Similar advantage is contemplated in the case of soles for shoes where puncture resistance against nails or the like is important.

While the invention has been described above using a polyurethane matrix and extended chain polyethylene fibers, it will be appreciated that various modifications may be made without departing from the scope of the invention. For example, other types of high strength fibers may be used to replace part or all of the polyethylene fibers, provided these other fibers are such that they do not bond well to the matrix. Such fibers may include, for example, textile fibers such as polyester, or metal or ceramic fibers which may be pre-treated so as to be non-adhesive to the matrix. Advantageously, polyester fibers are used if a relatively thick composite is to be prepared (e.g. one which is 10 millimeters thick). It has been found that with such thicker composites, it is difficult to control the exotherm, when a polyurethane matrix is formed in situ, to keep below the softening point of polyethylene fibers.

Additionally, while "Spectra" fibers have been exemplified, it should-be recognized that other equivalent high strength polyethylene fibers, e.g. those available as "Dynema", may be used A filler material may also be included in the composite. This may be, for example, another fiber, whether random or oriented or both; a pigment to provide color; glass microspheres or metal powder to reduce or increase density; resin plasticizers or modifiers; thixotropic agents; abrasives, etc., selected to provide the desired overall properties. Thus, as an illustration, an in situ reinforced syntatic foam may be made comprising a polyurethane matrix, extended chain polyethylene fibers and plastic or glass microspheres.

It will be appreciated that, regardless of the modifications which may be made, the composites of the invention should maintain certain essential characteristics. Firstly, there should be essentially no adhesion between at least the reinforcing portion of the fibrous component and the matrix. This is an important distinction over prior composites where it has been considered that bonding was essential. In the present case, freedom from any substantive amount of bonding between the reinforcing fibrous component and the matrix is essential so as to allow for interfacial movement or slippage between the resin and the fibrous component. This slippage is two directional, thus permitting recovery of the composite after bending.

Another essential feature is that the resin matrix should envelop most, if not all, the reinforcing fibers. This envelopment may be around individual fibers, typically the situation where random staple fibers are used. In this case, the side of each staple fiber slips back and forth at the interface With the enveloping resin. However, the matrix also envelops the ends of the staple so that it cannot move to a different location within the matrix.

Where bundles of fibers in continuous filament form are used, typically in an oriented fashion where the filaments are held in position by another yarn, e.g. in fabric form, the matrix will envelop each bundle but not necessarily each fiber of the bundle. An exception to complete envelopment may occur if it is desired to have the reinforcing fiber accessible to the composite surface, for example, to take advantage of the lubricious character of extended chain polyethylene fibers.

The desired combination of high strength and flexibility in the present composites apparently results from the fact that the fibers are not bonded to the matrix with consequent frictional effects between the two components. Desirably, the matrix also has a much smaller Young's modulus than the fibers. In this connection, it appears that the desired combination of strength and flexibility can be realized by multiplying the Young's modulus of the matrix material by ⅔ of the ratio of the length to radius of the fiber, i.e.

$$X = (Y)(\tfrac{2}{3})l/r$$

where Y is Young's modulus for the matrix, and 1 and r represent the length and radius of the fiber. If X is near or above the Young s modulus of the fiber ($17 \times 10^6$ psi for Spectra 900 and $25 \times 10^6$ psi for Spectra 1000), the strength of the matrix will approach that of the fiber times the percent volume loading. The resulting material remains flexible while maintaining optimum strength.

The scope of the invention is defined in the following claims wherein:

I claim:

1. The method of making a flexible composite comprising a fibrous component dispersed within a flexible polyurethane matrix which comprises forming the polyurethane matrix in situ about the fibrous component at a temperature up to about 120° C. but below the melting point of the fibrous component, the fibrous component being chosen so that the matrix and fibrous component are essentially chemically unbonded to each other whereby the composite retains essentially the flexibility of the polymeric matrix.

2. The method of claim 1 wherein urethane-forming components are mixed together and applied to the fibrous component and the urethane-forming reaction is allowed to occur.

3. The method of claim 2 wherein the fibrous component is a fabric.

4. The method of claim 2 wherein the urethane-forming components are preheated to 50° C., mixed together and applied to the fibrous component while the fibrous component is at ambient temperature, the resulting exothermic reaction raising the temperature to about 60° C.

5. The method of claim 2 wherein the fibrous component is selected from the group consisting of polyester, polyethylene and aramid fibers.

* * * * *